(12) United States Patent
Kim et al.

(10) Patent No.: US 10,718,408 B2
(45) Date of Patent: Jul. 21, 2020

(54) PLANETARY GEAR TRAIN OF AUTOMATIC TRANSMISSION FOR VEHICLE

(71) Applicants: Hyundai Motor Company, Seoul (KR); Kia Motors Corporation, Seoul (KR)

(72) Inventors: Jin Ho Kim, Suwon-si (KR); Jae Joon Lee, Anyang-si (KR); Jong Sool Park, Seongnam-si (KR); Kyeong Hun Lee, Seoul (KR); Jong Soo Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 60 days.

(21) Appl. No.: 16/197,081

(22) Filed: Nov. 20, 2018

(65) Prior Publication Data

US 2020/0032880 A1    Jan. 30, 2020

(30) Foreign Application Priority Data

Jul. 24, 2018   (KR) .................. 10-2018-0085700

(51) Int. Cl.
*F16H 3/62*   (2006.01)

(52) U.S. Cl.
CPC ....... *F16H 3/62* (2013.01); *F16H 2200/0069* (2013.01); *F16H 2200/2015* (2013.01); *F16H 2200/2046* (2013.01)

(58) Field of Classification Search
CPC ..... F16H 2200/0069; F16H 2200/2015; F16H 2200/2046
See application file for complete search history.

(56) References Cited

U.S. PATENT DOCUMENTS

| 4,041,807 A | * | 8/1977 | Herr | .......................... | F16H 3/64 475/124 |
| 5,954,608 A | * | 9/1999 | Kirkwood | ................. | F16H 3/66 475/116 |
| 2014/0004991 A1 | * | 1/2014 | Koch | ........................ | F16H 3/66 475/276 |

FOREIGN PATENT DOCUMENTS

KR    10-2017-0108440 A    9/2017

* cited by examiner

*Primary Examiner* — Timothy Hannon
(74) *Attorney, Agent, or Firm* — Morgan, Lewis & Bockius LLP

(57) ABSTRACT

A planetary gear train of an automatic transmission for a vehicle, may include an input shaft receiving power; an output shaft outputting power; a first planetary gear set having first, second, and third rotation elements; a second planetary gear set having fourth, fifth, and sixth rotation elements; a third planetary gear set having seventh, eighth, and ninth rotation elements; a fourth planetary gear set having tenth, eleventh, and twelfth rotation elements; a fifth planetary gear set having thirteenth, fourteenth, and fifteenth rotation elements; and first to ninth shafts connecting the rotation elements of the first planetary gear set to the fifth planetary gear set.

12 Claims, 2 Drawing Sheets

FIG. 2

| SHIFT STAGE | COUPLING ELEMENT | | | | | | GEAR RATIO | STEP RATIO |
|---|---|---|---|---|---|---|---|---|
| | CL1 | CL2 | CL3 | B1 | B2 | B3 | | |
| 1ST | O | | | | O | O | 5.688 | − |
| 2ND | O | | O | | | O | 3.676 | 1.547 |
| 3RD | | | O | | O | O | 2.634 | 1.395 |
| 4TH | O | | O | | O | | 1.990 | 1.324 |
| 5TH | | O | O | | O | | 1.611 | 1.235 |
| 6TH | O | O | | | O | | 1.225 | 1.315 |
| 7TH | O | O | O | | | | 1.000 | 1.225 |
| 8TH | O | O | | O | | | 0.825 | 1.212 |
| 9TH | | O | O | O | | | 0.695 | 1.186 |
| 10TH | O | | O | O | | | 0.635 | 1.095 |
| REV | O | | | O | | O | −3.678 | − |

PLANETARY GEAR TRAIN OF AUTOMATIC TRANSMISSION FOR VEHICLE

CROSS REFERENCE TO RELATED APPLICATION

The present application claims priority to Korean Patent Application No. 10-2018-0085700, filed Jul. 24, 2018, the entire contents of which is incorporated herein for all purposes by this reference.

BACKGROUND OF THE INVENTION

Field of the Invention

The present invention relates to a planetary gear train of an automatic transmission for a vehicle.

Description of Related Art

The multi-stage transmission enhances fuel efficiency of a vehicle by facilitating an engine to operate in a more efficient region over the entire travel region of the vehicle, and is directed to improve the drivability of the vehicle by providing a gear ratio which is more suitable for the driver's request.

Thus, to achieve an effect of the multi-stage transmission properly, a gear ratio span, which is the total transmission ratio range which may be provided by the transmission, may be increased, a step ratio, which is the difference between a gear stage and an adjacent gear stage, may be properly ensured, and the step ratio may be changed as linearly as possible.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle, in which ten forward and one reverse speeds are provided, and a wide gear ratio span, a step ratio above a predetermined level, and linearity of the step ratio are ensured while the torque to be handled by components is low, whereby it is possible to ensure sufficient durability.

In various aspects of the present invention, according to some aspect of the present invention, there is provided a planetary gear train of an automatic transmission for a vehicle, the planetary gear train including: an input shaft receiving power; an output shaft outputting power; a first planetary gear set having first, second, and third rotation elements; a second planetary gear set having fourth, fifth, and sixth rotation elements; a third planetary gear set having seventh, eighth, and ninth rotation elements; a fourth planetary gear set having tenth, eleventh, and twelfth rotation elements; a fifth planetary gear set having thirteenth, fourteenth, and fifteenth rotation elements; a first shaft connected to both the second rotation element and the input shaft; a second shaft connected to the fourteenth rotation element and the output shaft; a third shaft connected to the third rotation element and the fifth rotation element; a fourth shaft connected to the ninth rotation element and the twelfth rotation element; a fifth shaft connected to the tenth rotation element; a sixth shaft connected to the eleventh rotation element and the fifteenth rotation element; a seventh shaft connected to the first rotation element and the fourth rotation element; an eighth shaft connected to the sixth rotation element and the seventh rotation element; and a ninth shaft connected to the eighth rotation element and the thirteenth rotation element.

The planetary gear train may further include six coupling elements selectively connecting shafts of the first to the ninth shafts or selectively connecting a shaft and a transmission housing, wherein of the six coupling elements, three coupling elements are controlled to be simultaneously engaged with each other, such that a forward or reverse speed is implemented.

The six coupling elements may include: three clutches connecting two shafts of the first to the ninth shafts together; and three brakes selectively connecting shafts of the first to the ninth shafts without being connected to the input shaft or the output shaft, with the transmission housing.

The six coupling elements may include: a first clutch provided between the first shaft and the fifth shaft; a second clutch provided between the third shaft and the ninth shaft; a third clutch provided between the third shaft and the sixth shaft; a first brake provided between the seventh shaft and the transmission housing; a second brake provided between the eighth shaft and the transmission housing; and a third brake provided between the ninth shaft and the transmission housing.

The first rotation element, the second rotation element, and the third rotation element may include a first sun gear, a first planet carrier, and a first ring gear; the fourth rotation element, the fifth rotation element, and the sixth rotation element may include a second sun gear, a second planet carrier, and a second ring gear, respectively; the seventh rotation element, the eighth rotation element, and the ninth rotation element may include a third sun gear, a third planet carrier, and a third ring gear, respectively; the tenth rotation element, the eleventh rotation element, and the twelfth rotation element may include a fourth sun gear, a fourth planet carrier, and a fourth ring gear, respectively; and the thirteenth rotation element, the fourteenth rotation element, and the fifteenth rotation element may include a fifth sun gear, a fifth planet carrier, and a fifth ring gear.

The first, second, third, fourth, and fifth planetary gear sets may be disposed such that the first, the second, the third, the fourth, and the fifth planetary gear sets are sequentially disposed from respective first sides toward second sides.

In various aspects of the present invention, according to some aspect of the present invention, there is further provided a planetary gear train of an automatic transmission for a vehicle, the planetary gear train including: an input shaft and an output shaft; a first planetary gear set, a second planetary gear set, a third planetary gear set, a fourth planetary gear set, and a fifth planetary gear set provided between the input shaft and the output shaft; and six coupling elements configured to variably provide a frictional force, wherein the first planetary gear set is configured such that a first rotation element thereof is fixedly provided in a transmission housing and is directly connected to a first rotation element of the second planetary gear set, a second rotation element thereof is selectively connectable to both the input shaft and a first rotation element of the fourth planetary gear set, and a third rotation element thereof is directly connected to a second rotation element of the second planetary gear set and is selectively connectable to a second rotation element of the third planetary gear set and a second rotation element of the fourth planetary gear set, respectively; the second planetary gear set is configured such that a third rotation element thereof is directly connected to a first rotation element of the third planetary gear set and is fixedly provided in the transmission housing; the third planetary gear set is configured such that the second rotation element thereof is directly connected to a first rotation element of the fifth planetary gear set and is fixedly provided in the transmission housing, and a third rotation element thereof is directly connected to a third rotation element of the fourth planetary gear set; the fourth planetary gear set is configured such that the second rotation element thereof is directly connected to a third rotation element of the fifth planetary gear set; and the fifth planetary gear set is configured such that a second rotation element thereof is directly connected to the output shaft.

The input shaft and the output shaft may be disposed concentrically with each other, and the first, second, third, fourth, and fifth planetary gear sets may be disposed such that the first planetary gear set, the second planetary gear set, the third planetary gear set, the fourth planetary gear set, and the fifth planetary gear set are sequentially disposed along an axial direction of the input shaft and the output shaft.

The second rotation element of the first planetary gear set may be selectively connectable to the first rotation element of the fourth planetary gear set by a first clutch of the coupling elements; the third rotation element of the first planetary gear set may be selectively connectable to the second rotation element of the third planetary gear set by a second clutch of the coupling elements; and the third rotation element of the first planetary gear set may be selectively connectable to the second rotation element of the fourth planetary gear set by a third clutch of the coupling elements.

The first rotation element of the first planetary gear set may be fixedly connected to the transmission housing by a first brake of the coupling elements; the third rotation element of the second planetary gear set may be fixedly connected to the transmission housing by a second brake of the coupling elements; and the second rotation element of the third planetary gear set may be fixedly connected to the transmission housing by a third brake of the coupling elements.

The rotation elements of each of the first planetary gear set to the fifth planetary gear set may be disposed such that the first rotation element, the second rotation element, and the third rotation element are sequentially disposed radially outwardly from a rotation center, wherein the first planetary gear set may be configured such that the first rotation element is a first sun gear, the second rotation element is a first planet carrier, and the third rotation element is a first ring gear; the second planetary gear set may be configured such that the first rotation element is a second sun gear, the second rotation element is a second planet carrier, and the third rotation element is a third ring gear; the third planetary gear set may be configured such that the first rotation element is a third sun gear, the second rotation element is a third planet carrier, and the third rotation element is a third ring gear; the fourth planetary gear set may be configured such that the first rotation element is a fourth sun gear, the second rotation element is a fourth planet carrier, and the third rotation element is a fourth ring gear; and the fifth planetary gear set may be configured such that the first rotation element is a fifth sun gear, the second rotation element is a fifth planet carrier, and the third rotation element is a fifth ring gear.

In various aspects of the present invention, according to some aspect of the present invention, there is further provided a planetary gear train of an automatic transmission for a vehicle, the planetary gear train including: a first planetary gear set, a second planetary gear set, a third planetary gear set, a fourth planetary gear set, and a fifth planetary gear set provided with respective three rotation elements; six coupling elements configured to variably provide a frictional force; and nine shafts connected to the rotation elements of the planetary gear sets, wherein of the nine shafts, a first shaft is directly connected to a second rotation element of the first planetary gear set and an input shaft; a second shaft is directly connected to a second rotation element of the fifth planetary gear set and an output shaft; a third shaft is directly connected to a third rotation element of the first planetary gear set and a second rotation element of the second planetary gear set; a fourth shaft is directly connected to a third rotation element of the third planetary gear set and a third rotation element of the fourth planetary gear set; a fifth shaft is directly connected to a first rotation element of the fourth planetary gear set; a sixth shaft is directly connected to a second rotation element of the fourth planetary gear set and a third rotation element of the fifth planetary gear set; and remaining three shafts are fixedly provided in a transmission housing.

The three shafts fixedly provided in the transmission housing may include a seventh shaft, an eighth shaft, and a ninth shaft, wherein the seventh shaft may be directly connected to a first rotation element of the first planetary gear set and a first rotation element of the second planetary gear set; the eighth shaft may be directly connected to a third rotation element of the second planetary gear set and a first rotation element of the third planetary gear set; and the ninth shaft may be directly connected to a second rotation element of the third planetary gear set and a first rotation element of the fifth planetary gear set.

Of the six coupling elements, a first clutch may be provided between the first shaft and the fifth shaft; a second clutch may be provided between the third shaft and the ninth shaft; a third clutch may be provided between the third shaft and the sixth shaft; a first brake may be provided between the seventh shaft and the transmission housing; a second brake may be provided between the eighth shaft and the transmission housing; and a third brake may be provided between the ninth shaft and the transmission housing.

The first, second, third, fourth, and fifth planetary gear sets may be disposed such that the first planetary gear set, the second planetary gear set, the third planetary gear set, the fourth planetary gear set, and the fifth planetary gear set are sequentially disposed along an axial direction of the input shaft and the output shaft.

According to the planetary gear train of an automatic transmission for a vehicle configured as described above, it is advantageous in that ten forward and one reverse speeds are provided, and the gear ratio span reaches 9.0, so that the engine may be driven mainly in a more efficient region, whereby the fuel efficiency of the vehicle may be improved.

The present invention is further advantageous in that a minimum step ratio is 1.095 or more, and the change in the step ratio according to changing gear is linear, whereby the driving performance of the vehicle may be maximized by improving the vehicle acceleration before and after the shift, and the rhythm of the engine speed.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation mode table of the planetary gear train of FIG. 1.

Figure 1:
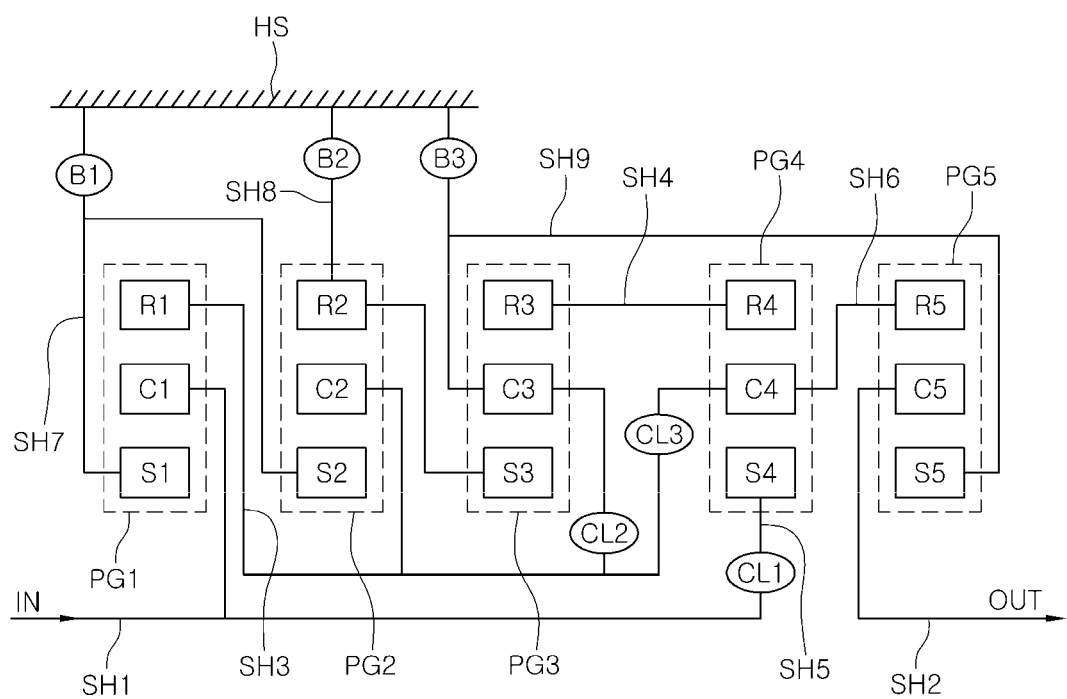
FIG. 1 is a view showing a planetary gear train of an automatic transmission for a vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinbelow, a multi-stage transmission for a vehicle according to an exemplary embodiment of the present invention will be described in detail with reference to the accompanying drawings.

Referring to FIG. 1, a planetary gear train of an automatic transmission for a vehicle of the present invention includes: an input shaft IN receiving power from a power source such as an engine in an engine side; an output shaft OUT outputting power; a first planetary gear set PG1 having first, second, third rotation elements; a second planetary gear set PG2 having fourth, fifth, sixth rotation elements; a third planetary gear set PG3 having seventh, eighth, ninth rotation elements; a fourth planetary gear set PG4 having tenth, eleventh, twelfth rotation elements; and a fifth planetary gear set PG5 having thirteenth, fourteenth, fifteenth rotation elements.

The planetary gear train includes: a first shaft SH1 connected to both the second rotation element and the input shaft IN; a second shaft SH2 connected to both the fourteenth rotation element and the output shaft OUT; a third shaft SH3 connected to both the third rotation element and the fifth rotation element; a fourth shaft SH4 connected to both the ninth rotation element and the twelfth rotation element; a fifth shaft SH5 connected to the tenth rotation element; a sixth shaft SH6 connected to both the eleventh rotation element and the fifteenth rotation element; a seventh shaft SH7 connected to both the first rotation element and the fourth rotation element; an eighth shaft SH8 connected to both the sixth rotation element and the seventh rotation element; and a ninth shaft SH9 connected to both the eighth rotation element and the thirteenth rotation element.

The first, second, third, fourth, fifth planetary gear sets are disposed such that the first planetary gear set PG1, the second planetary gear set PG2, the third planetary gear set PG3, the fourth planetary gear set PG4, and the fifth planetary gear set PG5 are sequentially disposed from respective first sides toward second sides with respect to the engine side.

In other words, a power source such as an engine may supply power through the input shaft IN and first shaft SH1, and after the supplied power is appropriately shifted through the configuration of the present invention, in which the first planetary gear set PG1, the second planetary gear set PG2, the third planetary gear set PG3, the fourth planetary gear set PG4, and the fifth planetary gear set PG5 are sequentially disposed, then the power is output to the output shaft OUT via the fourteenth rotation element of the fifth planetary gear set PG5 and the second shaft SH2.

Each of the first planetary gear set PG1, the second planetary gear set PG2, the third planetary gear set PG3, the fourth planetary gear set PG4, and the fifth planetary gear set PG5 forming the planetary gear train is a single pinion planetary gear set having three rotation elements.

The planetary gear train is mounted in a transmission housing HS, wherein a torque converter may be provided between the power source such as an engine and the input shaft IN and the power output to the output shaft OUT may be supplied to the drive wheel of the vehicle through a differential which is not shown.

The planetary gear train further includes six coupling elements selectively connecting shafts of the first shaft SH1 to the ninth shaft SH9 or selectively connecting a shaft and the transmission housing, wherein of the six coupling elements, three coupling elements are controlled to be simultaneously engaged with each other, such that a forward or reverse speed is implemented.

In other words, in implementing one of first to tenth forward gear stages and R-gear as a reverse speed as shown in FIG. 2, three predetermined coupling elements of the six coupling elements are engaged with each other such that the corresponding gear stage is implemented.

Of course, when shifting from one stage to a neighboring stage of the gear stages, a clutch-to-clutch shifting, in which shifting is performed by engaging one coupling element in the target gear stage while releasing another coupling element in the present gear stage of the respective three coupling elements required for implementing each gear stage, is possible.

The six coupling elements include three clutches connecting two shafts of the first shaft SH1 to the ninth shaft SH9 together, and three brakes selectively connecting shafts of the first shaft SH1 to the ninth shaft SH9 without being connected to the input shaft IN or the output shaft OUT, with the transmission housing.

In the exemplary embodiment of FIG. 1, the six coupling elements include: a first clutch CL1 provided between the first shaft SH1 and the fifth shaft SH5; a second clutch CL2 provided between the third shaft SH3 and the ninth shaft SH9; a third clutch CL3 provided between the third shaft SH3 and the sixth shaft SH6; a first brake B1 provided between the seventh shaft SH7 and the transmission housing; a second brake B2 provided between the eighth shaft SH8 and the transmission housing; and a third brake B3 provided between the ninth shaft SH9 and the transmission housing.

Furthermore, the first rotation element, the second rotation element, and the third rotation element include a first sun gear S1, a first planet carrier C1, and a first ring gear R1;

the fourth rotation element, the fifth rotation element, and the sixth rotation element include a second sun gear S2, a second planet carrier C2, and a second ring gear R2; the seventh rotation element, the eighth rotation element, and the ninth rotation element include a third sun gear S3, a third planet carrier C3, and a third ring gear R3; the tenth rotation element, the eleventh rotation element, and the twelfth rotation element include a fourth sun gear S4, a fourth planet carrier C4, and a fourth ring gear R4; and the thirteenth rotation element, the fourteenth rotation element, and the fifteenth rotation element include a fifth sun gear S5, a fifth planet carrier C5, and a fifth ring gear R5.

The planetary gear train of an automatic transmission for a vehicle configured as described above implements gear stages according to the operation mode table of FIG. 2.

A first forward speed is implemented by engaging the first clutch CL1, the second brake B2, and the third brake B3 with each other.

The power input to the input shaft IN and the first shaft SH1 is directly input to the fourth sun gear S4 of the fourth planetary gear set PG4 through the fifth shaft SH5 due to the engagement of the first clutch CL1; the second ring gear R2, the eighth shaft SH8, and the third sun gear S3 are locked due to the engagement of the second brake B2; and the third clutch CL3, the ninth shaft SH9, and the fifth sun gear S5 are locked due to the engagement of the third brake B3, whereby the third sun gear S3 and the third clutch CL3 are locked, the third ring gear R3 is locked, and the fourth ring gear R4 is locked through the fourth shaft SH4, thus the power of the first shaft SH1 input to the fourth sun gear S4 is decelerated at the fourth planet carrier C4 and transmitted to the fifth ring gear R5 through the sixth shaft SH6, and then the power transmitted to the fifth ring gear R5 is decelerated through the fifth planet carrier C5, with the fifth sun gear S5 locked, and is output to the second shaft SH2 and the output shaft OUT while forming the first forward speed.

A second forward speed is implemented by releasing the second brake B2 and engaging the third clutch CL3. With the third brake B3 providing a reaction force through the ninth shaft SH9, the power input to the first shaft SH1 is shifted by the planetary gear sets, then is decelerated, and is output to the fifth planet carrier C5 while forming the second forward speed.

A third forward speed is implemented by releasing the first clutch CL1 and engaging the second brake B2.

The second brake B2 locks the eighth shaft SH8, and with the third brake B3 locking the ninth shaft SH9, the power input to the first shaft SH1 is shifted by the planetary gear sets, then is decelerated and is output through the fifth planet carrier C5 and the second shaft SH2 to form the third forward speed.

A fourth forward speed is implemented by releasing the third brake B3 and engaging the first clutch CL1.

With the second brake B2 locking the eighth shaft SH8, the power input to the first shaft SH1 is shifted by the planetary gear sets, then is decelerated and is output through the fifth planet carrier C5 and the second shaft SH2 to form the fourth forward speed.

A fifth forward speed is implemented by releasing the first clutch CL1 and engaging the second clutch CL2.

With the second brake B2 locking the eighth shaft SH8, the power input to the first shaft SH1 is shifted by the planetary gear sets, then is decelerated and is output through the fifth planet carrier C5 and the second shaft SH2 to form the fifth forward speed.

A sixth forward speed is implemented by releasing the third clutch CL3 and engaging the first clutch CL1.

With the second brake B2 locking the eighth shaft SH8, the power input to the first shaft SH1 is shifted by the planetary gear sets, then is decelerated and is output through the fifth planet carrier C5 and the second shaft SH2 to form the sixth forward speed.

A seventh forward speed is implemented by releasing the second brake B2 and engaging the third clutch CL3.

In the instant state, the power input to the first shaft SH1 is directly output through the second shaft SH2 and the output shaft OUT while forming a 1:1 gear ratio.

An eighth forward speed is implemented by releasing the third clutch CL3 and engaging the first brake B, wherein the power input to the input shaft IN and the first shaft SH1 is shifted by the planetary gear sets, then is accelerated and is output through the fifth planet carrier C5 and the second shaft SH2 to form the eighth forward speed.

A ninth forward speed is implemented by releasing the first clutch CL1 and engaging the third clutch CL3, wherein the power input to the input shaft IN and the first shaft SH1 is shifted by the planetary gear sets, then is accelerated and is output through the fifth planet carrier C5 and the second shaft SH2 to form the ninth forward speed.

A tenth forward speed is implemented by releasing the second clutch CL2 and engaging the first clutch CL1, wherein the power input to the input shaft IN and the first shaft SH1 is shifted by the planetary gear sets, then is accelerated and is output through the fifth planet carrier C5 and the second shaft SH2 to form the tenth forward speed.

An R-gear, which is a reverse speed, is implemented by engaging the first clutch CL1, the first brake B1, and the third brake B3.

In the instant state, the power input to the input shaft IN and the first shaft SH1 is decelerated by the planetary gear sets, and is reversed in its rotation direction to form the output of the reverse speed to the output shaft OUT through the fifth planet carrier C5 and the second shaft SH2.

The present invention described above may be expressed as follows.

In other words, the planetary gear train of an automatic transmission for a vehicle according to an exemplary embodiment of the present invention may include the input shaft IN and the output shaft OUT; the first planetary gear set PG1, the second planetary gear set PG2, the third planetary gear set PG3, the fourth planetary gear set PG4, and the fifth planetary gear set PG5 provided between the input shaft IN and the output shaft OUT; and six coupling elements configured to variably provide a frictional force.

Herein, the first planetary gear set PG1 is configured such that the first rotation element thereof is fixedly provided in the transmission housing HS and is directly connected to the first rotation element of the second planetary gear set PG2, the second rotation element thereof is selectively connectable to both the input shaft IN and the first rotation element of the fourth planetary gear set PG4, the third rotation element thereof is directly connected to the second rotation element of the second planetary gear set PG2 and is selectively connectable to the second rotation element of the third planetary gear set PG3 and the second rotation element of the fourth planetary gear set PG4, respectively;

The second planetary gear set PG2 is configured such that the third rotation element thereof is directly connected to the first rotation element of the third planetary gear set PG3 and is fixedly provided in the transmission housing HS;

The third planetary gear set PG3 is configured such that the second rotation element thereof is directly connected to the first rotation element of the fifth planetary gear set PG5 and is fixedly provided in the transmission housing HS, and the third rotation element thereof is directly connected to the third rotation element of the fourth planetary gear set PG4;

The fourth planetary gear set PG4 is configured such that the second rotation element thereof is directly connected to the third rotation element of the fifth planetary gear set PG5; and The fifth planetary gear set PG5 is configured such that the second rotation element thereof is directly connected to the output shaft OUT.

The input shaft IN and the output shaft OUT are disposed concentrically with each other; and The first planetary gear set PG1 to the fifth planetary gear set PG5 are configured such that the first planetary gear set PG1, the second planetary gear set PG2, the third planetary gear set PG3, the fourth planetary gear set PG4, and the fifth planetary gear set PG5 are sequentially disposed along an axial direction of the input shaft IN and the output shaft OUT.

The second rotation element of the first planetary gear set PG1 is selectively connectable to the first rotation element of the fourth planetary gear set PG4 by the first clutch CL1 of the coupling elements; the third rotation element of the first planetary gear set PG1 is selectively connectable to the second rotation element of the third planetary gear set PG3 by the second clutch CL2 of the coupling elements; and the third rotation element of the first planetary gear set PG1 is selectively connectable to the second rotation element of the fourth planetary gear set PG4 by the third clutch CL3 of the coupling elements.

The first rotation element of the first planetary gear set PG1 is fixedly connected to the transmission housing HS by the first brake B1 of the coupling elements; the third rotation element of the second planetary gear set PG2 is fixedly connected to the transmission housing HS by the second brake B2 of the coupling elements; and the second rotation element of the third planetary gear set PG3 is fixedly connected to the transmission housing HS by the third brake B3 of the coupling elements.

The rotation elements of each of the first planetary gear set PG1 to the fifth planetary gear set PG5 are disposed such that the first rotation element, the second rotation element, and the third rotation element are sequentially disposed radially outwardly from a rotation center, wherein the first planetary gear set PG1 is configured such that the first rotation element is the first sun gear S1, the second rotation element is the first planet carrier C1, and the third rotation element is the first ring gear R1; the second planetary gear set PG2 is configured such that the first rotation element is the second sun gear S2, the second rotation element is the second planet carrier C2, and the third rotation element is the second ring gear R2; the third planetary gear set PG3 is configured such that the first rotation element is the third sun gear S3, the second rotation element is the third planet carrier C3, and the third rotation element is the third ring gear R3; the fourth planetary gear set PG4 is configured such that the first rotation element is the fourth sun gear S4, the second rotation element is the fourth planet carrier C4, and the third rotation element is the fourth ring gear R4; and the fifth planetary gear set PG5 is configured such that the first rotation element is the fifth sun gear S5, the second rotation element is the fifth planet carrier C5, and the third rotation element is the fifth ring gear R5.

Furthermore, the present invention described above may be expressed as follows.

In other words, the planetary gear train of an automatic transmission for a vehicle according to an exemplary embodiment of the present invention may include the first planetary gear set PG1, the second planetary gear set PG2, the third planetary gear set PG3, the fourth planetary gear set PG4, and the fifth planetary gear set PG5 provided with respective three rotation elements; six coupling elements configured to variably provide a frictional force; and nine shafts connected to the rotation elements of the planetary gear sets.

Herein, of the nine shafts, the first shaft SH1 is directly connected to both the second rotation element of the first planetary gear set PG1 and the input shaft IN; the second shaft SH2 is directly connected to both the second rotation element of the fifth planetary gear set PG5 and the output shaft OUT; the third shaft SH3 is directly connected to both the third rotation element of the first planetary gear set PG1 and the second rotation element of the second planetary gear set PG2; the fourth shaft SH4 is directly connected to both the third rotation element of the third planetary gear set PG3 and the third rotation element of the fourth planetary gear set PG4; the fifth shaft SH5 is directly connected to the first rotation element of the fourth planetary gear set PG4; the sixth shaft SH6 is directly connected to both the second rotation element of the fourth planetary gear set PG4 and the third rotation element of the fifth planetary gear set PG5; and remaining three shafts are fixedly provided in the transmission housing HS.

The three shafts fixedly provided in the transmission housing include the seventh shaft SH7, the eighth shaft SH8, and the ninth shaft SH9, wherein the seventh shaft SH7 is directly connected to both the first rotation element of the first planetary gear set PG1 and the first rotation element of the second planetary gear set PG2; the eighth shaft SH8 is directly connected to both the third rotation element of the second planetary gear set PG2 and the first rotation element of the third planetary gear set PG3; and the ninth shaft SH9 is directly connected to both the second rotation element of the third planetary gear set PG3 and the first rotation element of the fifth planetary gear set PG5.

Of the six coupling elements, the first clutch CL1 is provided between the first shaft SH1 and the fifth shaft SH5; the second clutch CL2 is provided between the third shaft SH3 and the ninth shaft SH9; the third clutch CL3 is provided between the third shaft SH3 and the sixth shaft SH6; the first brake B1 is provided between the seventh shaft SH7 and the transmission housing HS; the second brake B2 is provided between the eighth shaft SH8 and the transmission housing HS; and the third brake B3 is provided between the ninth shaft SH9 and the transmission housing HS.

The first planetary gear set PG1 to the fifth planetary gear set PG5 are configured such that the first planetary gear set PG1, the second planetary gear set PG2, the third planetary gear set PG3, the fourth planetary gear set PG4, and the fifth planetary gear set PG5 are sequentially disposed along the axial direction of the input shaft IN and the output shaft OUT.

As described above, according to the planetary gear train of an automatic transmission for a vehicle of the present invention, ten forward and one reverse speeds are provided, and the gear ratio span reaches 9.0, so that the engine may be driven mainly in a more efficient region, whereby it is possible to improve the fuel efficiency of the vehicle.

Furthermore, according to an exemplary embodiment of the present invention, the minimum step ratio is 1.095 or more, and the linearity of the step ratio changes with the gear stage change is ensured to be similar to the tendency of the ideal step ratio change, whereby the driving performance of the vehicle may be maximized by improving the vehicle acceleration before and after the shift, and the rhythm of the engine speed.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train apparatus of an automatic transmission for a vehicle, the planetary gear train apparatus comprising:
   an input shaft receiving power;
   an output shaft outputting power;
   a first planetary gear set having a first rotation element, a second rotation element, and a third rotation element;
   a second planetary gear set having a fourth rotation element, a fifth rotation element, and a sixth rotation element;
   a third planetary gear set having a seventh rotation element, an eighth rotation element, and a ninth rotation element;
   a fourth planetary gear set having a tenth rotation element, an eleventh rotation element, and a twelfth rotation element;
   a fifth planetary gear set having a thirteenth rotation element, a fourteenth rotation element, and a fifteenth rotation element;
   a first shaft fixedly connected to the second rotation element and the input shaft;
   a second shaft fixedly connected to the fourteenth rotation element and the output shaft;
   a third shaft fixedly connected to the third rotation element and the fifth rotation element;
   a fourth shaft fixedly connected to the ninth rotation element and the twelfth rotation element;
   a fifth shaft fixedly connected to the tenth rotation element;
   a sixth shaft fixedly connected to the eleventh rotation element and the fifteenth rotation element;
   a seventh shaft fixedly connected to the first rotation element and the fourth rotation element;
   an eighth shaft fixedly connected to the sixth rotation element and the seventh rotation element; and
   a ninth shaft fixedly connected to the eighth rotation element and the thirteenth rotation element.

2. The planetary gear train apparatus of claim 1, further including:
   six coupling elements selectively connecting shafts among the first to the ninth shafts or selectively connecting a shaft among the first to the ninth shafts and a transmission housing,
   wherein three coupling elements among the six coupling elements are controlled to be engaged with each other such that a forward speed or a reverse speed is implemented.

3. The planetary gear train apparatus of claim 2, wherein the six coupling elements include:
   three clutches connecting two shafts among the first to the ninth shafts together; and
   three brakes selectively connecting predetermined shafts among the first to the ninth shafts without being connected to the input shaft or the output shaft, with the transmission housing.

4. The planetary gear train apparatus of claim 2, wherein the six coupling elements include:
   a first clutch mounted between the first shaft and the fifth shaft;
   a second clutch mounted between the third shaft and the ninth shaft;
   a third clutch mounted between the third shaft and the sixth shaft;
   a first brake mounted between the seventh shaft and the transmission housing;
   a second brake mounted between the eighth shaft and the transmission housing; and
   a third brake mounted between the ninth shaft and the transmission housing.

5. The planetary gear train apparatus of claim 1,
   wherein the first rotation element, the second rotation element, and the third rotation element include a first sun gear, a first planet carrier, and a first ring gear, respectively,
   wherein the fourth rotation element, the fifth rotation element, and the sixth rotation element include a second sun gear, a second planet carrier, and a second ring gear, respectively,
   wherein the seventh rotation element, the eighth rotation element, and the ninth rotation element include a third sun gear, a third planet carrier, and a third ring gear, respectively,
   wherein the tenth rotation element, the eleventh rotation element, and the twelfth rotation element include a fourth sun gear, a fourth planet carrier, and a fourth ring gear, respectively, and
   wherein the thirteenth rotation element, the fourteenth rotation element, and the fifteenth rotation element include a fifth sun gear, a fifth planet carrier, and a fifth ring gear, respectively.

6. The planetary gear train apparatus of claim 1, wherein the first, the second, the third, the fourth, and the fifth planetary gear sets are sequentially disposed from an engine side.

7. A planetary gear train apparatus of an automatic transmission for a vehicle, the planetary gear train apparatus comprising:
   an input shaft and an output shaft;
   a first planetary gear set, a second planetary gear set, a third planetary gear set, a fourth planetary gear set, and a fifth planetary gear set mounted between the input shaft and the output shaft; and
   six coupling elements configured to variably provide a frictional force,
   wherein a first rotation element of the first planetary gear set is selectively connectable to a transmission housing and is fixedly connected to a first rotation element of the second planetary gear set, a first rotation element of the fourth planetary gear set is selectively connectable to the input shaft and a second rotation element of the first planetary gear set, and a third rotation element of the first planetary gear set is fixedly connected to a second rotation element of the second planetary gear set and is selectively connectable to a second rotation element of the third planetary gear set and a second rotation element of the fourth planetary gear set, respectively, wherein a third rotation element of the second planetary gear set is fixedly connected to a first rotation element of the third planetary gear set and is selectively connectable to the transmission housing, wherein the second rotation element of the third planetary gear set is fixedly connected to a first rotation element of the fifth planetary gear set and is selectively connectable to the transmission housing, and a third rotation element of the third planetary gear set is fixedly connected to a third rotation element of the fourth planetary gear set, wherein the second rotation element of the fourth planetary gear set is fixedly connected to a third rotation element of the fifth planetary gear set, and wherein a second rotation element of the fifth planetary gear set is fixedly connected to the output shaft.

8. The planetary gear train apparatus of claim 7,
wherein the input shaft and the output shaft are disposed concentrically with each other, and
wherein the first planetary gear set, the second planetary gear set, the third planetary gear set, the fourth planetary gear set, and the fifth planetary gear set are sequentially disposed along an axial direction of the input shaft and the output shaft from an engine side.

9. The planetary gear train apparatus of claim 8,
wherein the second rotation element of the first planetary gear set is selectively connectable to the first rotation element of the fourth planetary gear set by a first clutch of the six coupling elements,
wherein the third rotation element of the first planetary gear set is selectively connectable to the second rotation element of the third planetary gear set by a second clutch of the six coupling elements, and
wherein the third rotation element of the first planetary gear set is selectively connectable to the second rotation element of the fourth planetary gear set by a third clutch of the six coupling elements.

10. The planetary gear train apparatus of claim 9,
wherein the first rotation element of the first planetary gear set is selectively connectable to the transmission housing by a first brake of the six coupling elements,
wherein the third rotation element of the second planetary gear set is selectively connectable to the transmission housing by a second brake of the six coupling elements, and
wherein the second rotation element of the third planetary gear set is selectively connectable to the transmission housing by a third brake of the six coupling elements.

11. The planetary gear train apparatus of claim 10,
wherein the first, second, and third rotation elements of each of the first planetary gear set to the fifth planetary gear set are sequentially disposed radially outwardly from a rotation center of each of the first planetary gear set to the fifth planetary gear set.

12. The planetary gear train apparatus of claim 10,
wherein the first rotation element of the first planetary gear set is a first sun gear, the second rotation element of the first planetary gear set is a first planet carrier, and the third rotation element of the first planetary gear set is a first ring gear,
wherein the first rotation element of the second planetary gear set is a second sun gear, the second rotation element of the second planetary gear set is a second planet carrier, and the third rotation element of the second planetary gear set is a third ring gear,
wherein the first rotation element of the third planetary gear set is a third sun gear, the second rotation element of the third planetary gear set is a third planet carrier, and the third rotation element of the third planetary gear set is a third ring gear,
wherein the first rotation element of the fourth planetary gear set is a fourth sun gear, the second rotation element of the fourth planetary gear set is a fourth planet carrier, and the third rotation element of the fourth planetary gear set is a fourth ring gear, and
wherein the first rotation element of the fifth planetary gear set is a fifth sun gear, the second rotation element of the fifth planetary gear set is a fifth planet carrier, and the third rotation element of the fifth planetary gear set is a fifth ring gear.

* * * * *